Patented Oct. 2, 1951

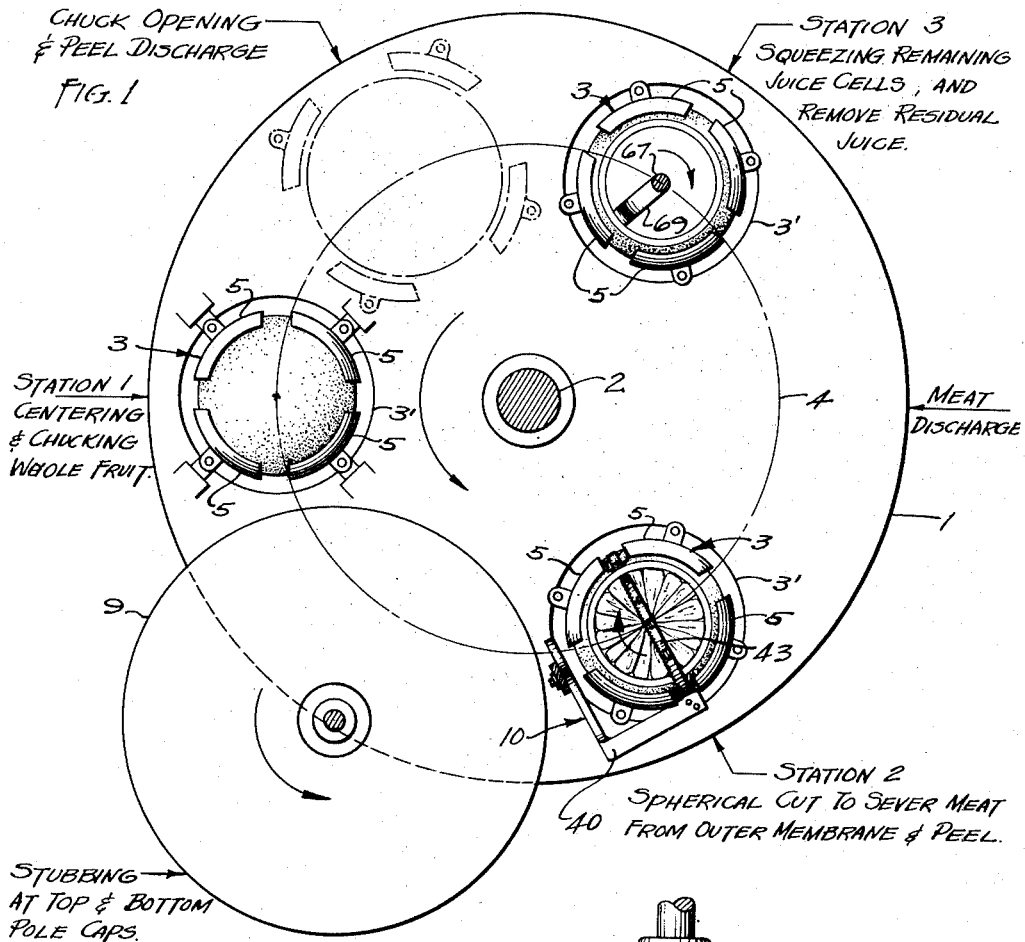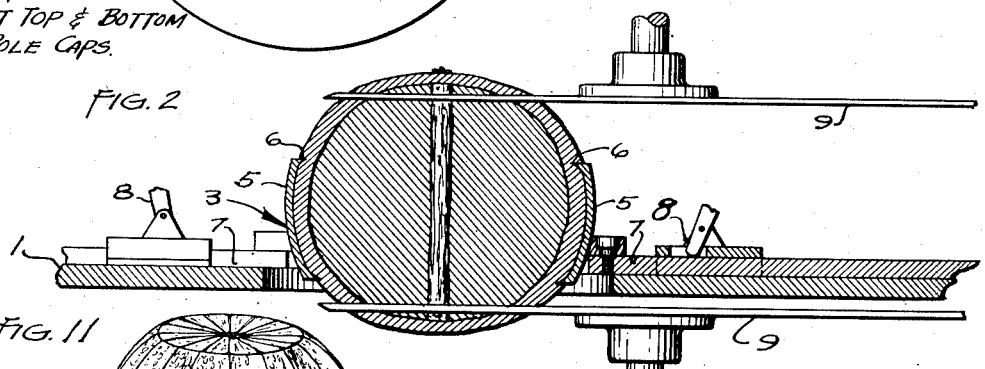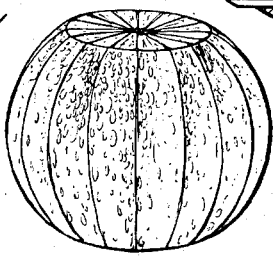

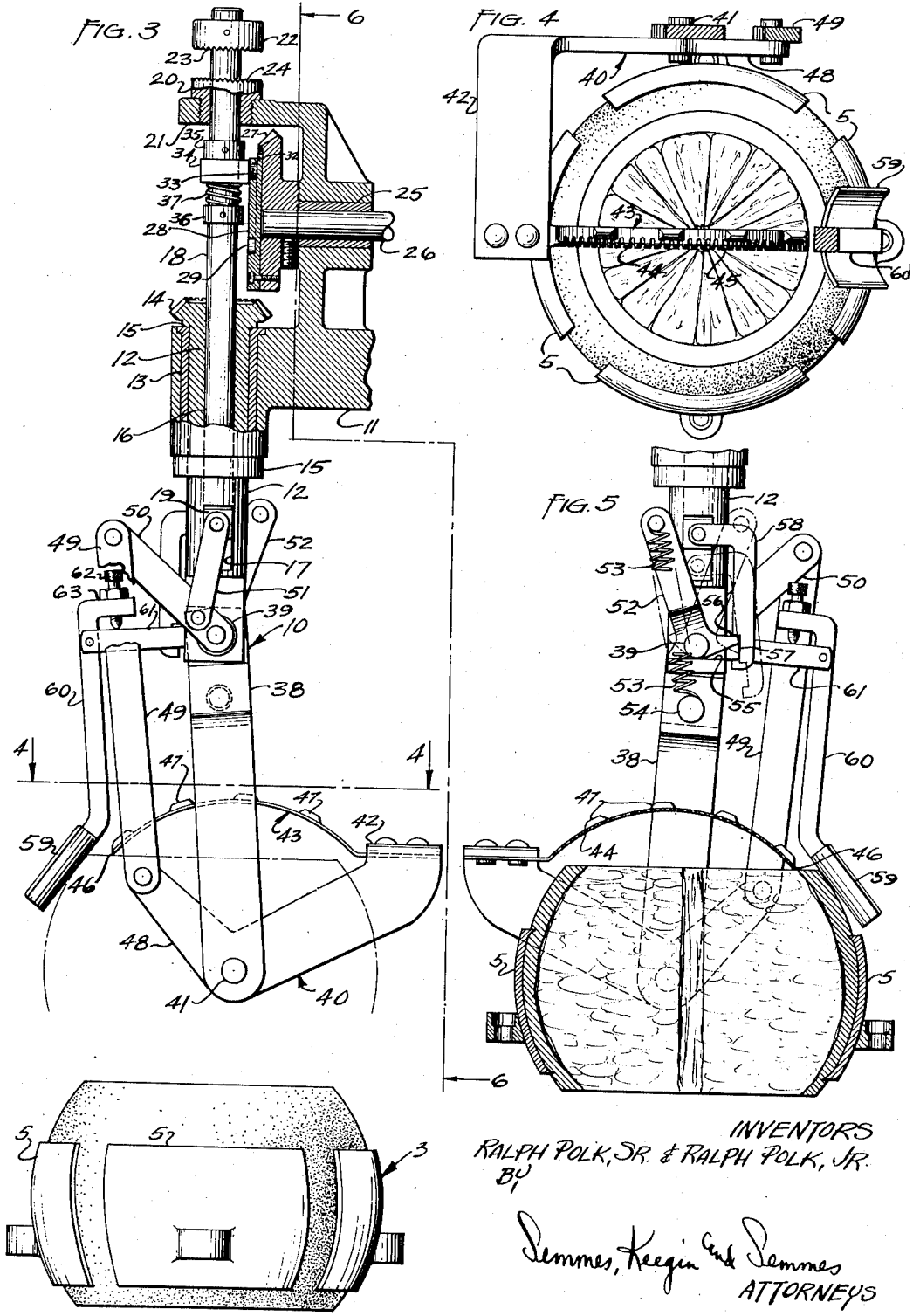

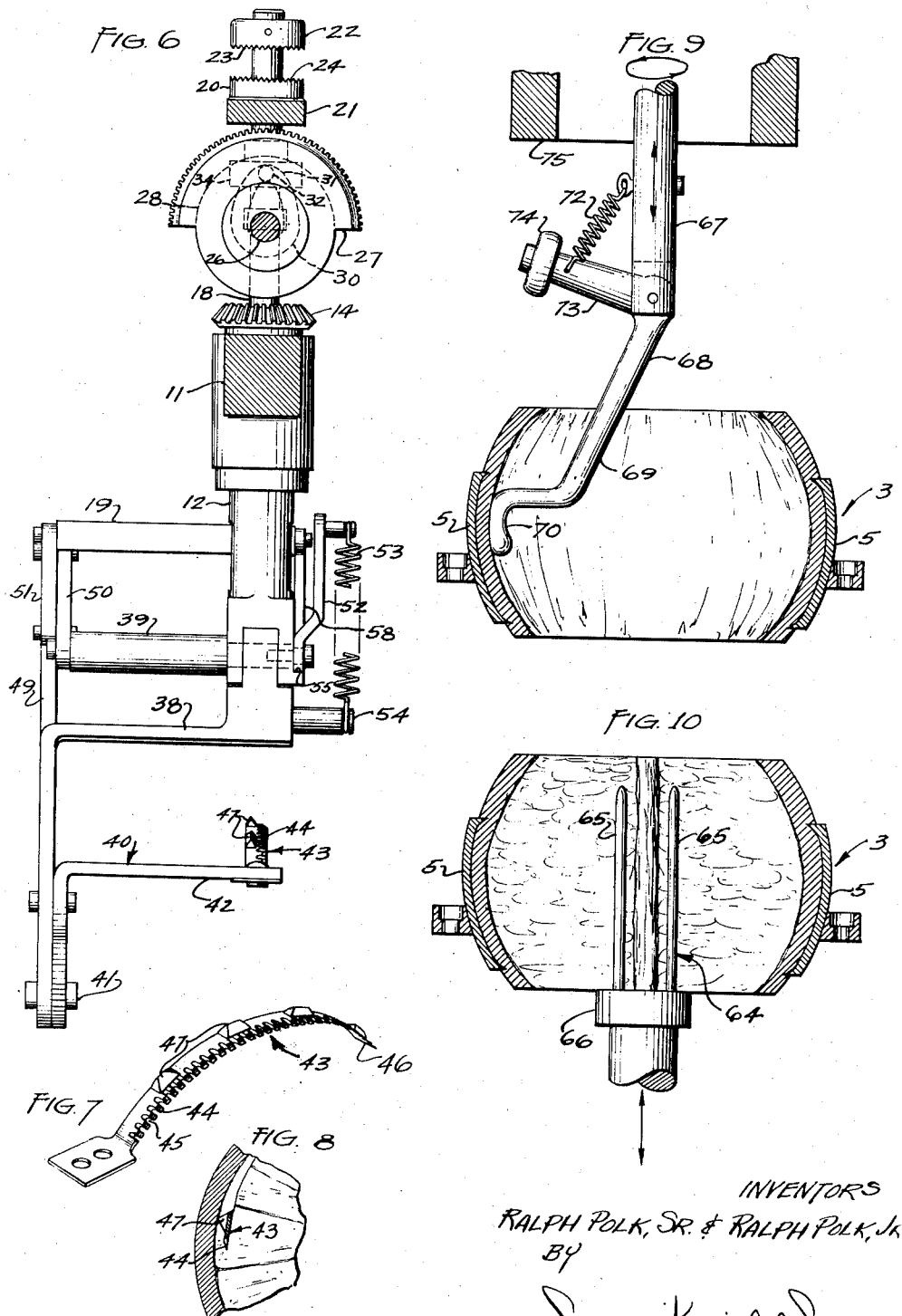

2,570,071

UNITED STATES PATENT OFFICE 2,570,071

APPARATUS FOR PEELING FRUIT

Ralph Polk, Sr., Miami, and Ralph Polk, Jr., Tampa, Fla., assignors to The Polk Development Company, Tampa, Fla., a copartnership of Florida Application September 26, 1946, Serial No. 699,434

7 Claims. (Cl. 146—3)

This invention relates to the peeling of fruit and more particularly to an industrial method and apparatus for removing the peel and a thin layer underlying the same from relatively thick skin fruit.

The invention is particularly adaptable for removing the outer peel, albedo, and outer segmental membrane cleanly from citrus fruit, such as grapefruit, prior to "sectionizing" the meat and will be described in connection with peeling grapefruit. It will be understood, however, that the invention is also adaptable for peeling other types of relatively thick skinned fruit such as pineapples.

Citrus fruit is composed of sections or carpels of interconnected juice sacs, each carpel being in the form of a segment surrounded by a thin wall of comparatively tough membrane. Several of these carpels or sections surround a soft pithy core and are surrounded by a rind or peel which consists of a white spongy inner layer or albedo and a colored outer layer.

For the purpose of this application, the portions of the segment walls which extend more or less radially from the core, will be referred to as the "radial membranes," while the portions of the segment walls which lie adjacent the peel will be referred to as the "outer membrane." The term "meat" will refer to the natural group of segments as a substantial whole but freed of at least the outer membrane. The term "stubbed fruit" will refer to fruit having at least the peel and outer membrane removed from adjacent the polar regions of the fruit but with an equatorial band of the peel left intact on the fruit.

"Sectionizing" in the citrus industry consists in dividing the fruit, particularly grapefruit, into its membrane free and substantially whole individual, natural sections. Prior to the actual sectionizing operation, the outer peel, albedo and the outer membrane are removed. As usually carried out, the outer peel and albedo are peeled off of the fruit and the peeled fruit subjected to a hot lye bath to remove the outer membrane.

If the peeling is performed by hand, the operation is time-consuming and expensive. Machinery has been developed for mechanically removing the peel but the machinery heretofore produced has not been entirely satisfactory because of its inability to completely remove the albedo. The hot lye treatment employed for removing the outer membrane also has several disadvantages in that it bleaches the fruit somewhat, imparts a slight "cooked" taste, is disagreeable to perform and requires subsequent washing and cooling. Moreover, the hot lye bath fails to remove a thickened strip of the membrane at the juncture of the outer and radial walls of certain fruit. The juice sacs tenaciously adhere to these strips making subsequent separation of the segment meats from the membrane difficult to perform without mutilating the meats.

We have found that by first stubbing or removing the peel and outer membrane from the polar regions of the fruit to expose the meat, the meat may readily be removed as a substantial whole from the remaining equatorial band of peel and outer membrane by passing a blade curved to the general contour of the fruit between the equatorial band of peel and meat just inside the outer membrane. This may be done mechanically and rapidly by rotating the curved blade about an axis coaxial with the stubbed fruit while supporting the fruit by the equatorial band of peel. Preferably, the blade is urged resiliently outwardly against the band of peel which thereby serves to guide the blade according to the cross sectional shape of the fruit. The band of peel serves also to support the meat until severed from the peel. Such a method of peeling citrus fruit is described and claimed in our co-pending application Serial No. 671,134, filed May 21, 1946 entitled Fruit Peeling Method and Apparatus. Application Serial No. 671,134 was allowed on October 11, 1950 patented May 1, 1951, Patent No. 2,551,156.

Cutting the meat thus from the band of peel by the above method, cleanly and without mutilation of the meat, so that it is ready and suitable for subsequently sectionizing, presents several problems the solution of which, and to overcome other disadvantages of prior peeling methods and machines, constitutes one of the important objects of this invention.

Another object of the invention is to provide apparatus for peeling citrus fruit in which portions of at least the peel and outer membrane are removed from the polar regions of the fruit leaving a band of the peel intact thereon, then severing the meat, as a substantial whole, from the band of peel and remaining outer membrane and then extracting the juice from sacs remaining attached to the band of peel after severing the meat therefrom.

A further object of the invention is to provide apparatus of the character in which the meat is severed from the band of peel by means of a blade curved substantially to the contour of the fruit which is moved about the fruit spaced a predetermined distance just inside the outer membrane and which is oscillated in the arc of its curvature to produce a clean spherical cut through the meat and radial membrane walls without mutilating the segment meats.

A still further object of the invention is to provide a cutting blade for performing the above function which is constructed to provide ease in guiding the same with respect to the band of peel in its cutting circuit and which offers a minimum of resistance to passage through the meat.

To accomplish the above and other important objects and advantages which will becomes more apparent during the course of the following description, the invention consists in the procedural steps and the parts and combinations hereinafter set forth with the understanding that the method may be carried out by hand operations or by machine, in the order set forth or variations of such order which will be obvious to those skilled in the art, and that the invention is not restricted to the specific embodiment of mechanism illustrated by way of example of a means for carrying the invention into practical effect.

Generally, the invention comprises supporting citrus fruit, particularly grapefruit, in a chuck which engages the fruit about its equatorial region, and holds it, preferably with its polar axis vertical. While so supported, the peel and outer membrane are removed from adjacent opposite polar regions of the fruit conveniently and rapidly by slicing off polar cap portions of the fruit to expose the meat of its segments. While still supported in the chuck, a blade having a curvature corresponding generally to the contour of an average size grapefruit and preferably having a saw-tooth cutting edge, is inserted polarwise completely through the capped fruit starting at the upper capped surface and following a line longitudinally just inside the outer membrane of a segment. After the blade has penetrated the fruit, it is moved through one complete revolution equatorwise about the fruit while being urged resiliently, outwardly toward the peel. At the same time, the blade is given a rather rapid reciprocating motion through a small angle about the center of its curvature which produces a sawing action to cut cleanly through the meat and radial membranes of the segments. At the completion of the single revolution, the cutting motion is stopped and the blade withdrawn by reversing the penetrating movement.

The thus severed meat may be now removed from the band of peel and sent to further processing such as the sectionizing operation above mentioned. Any suitable means such as a simple plunger (not shown) or a holding fork or spindle, to be described, may be employed to aid in removing the severed meat from the band of peel. The meat removal is easily accomplished as it will be understood that the albedo layer of citrus fruit is quite spongy and easily compressible and further, that the curved blade in its circuit about the fruit leaves a void between the meat and peel, as clearly indicated in Figure 8 of the drawings, thus reducing somewhat the diameter of the meat. As a result of the compressibility of the albedo and the reduced diameter of the severed meat, it has been found in practice that the meat may be removed from the band of peel through one of the capped ends without substantial mutilation of the meat or tearing of the peel.

While the severing operation is performed as closely to the outer membrane as practical, there will usually be a layer of juice sacs or portions thereof left adhering to the outer membrane. After removal of the meat and while the band of peel remains in the chuck, a radially outward rubbing pressure is exerted on the inner surface of the peel band to rupture these residual sacs to extract their juice.

While, as stated, the above operations may be performed by hand, perferably, for rapid production, they are carried out mechanically by a cyclically operated machine such as is somewhat diagrammatically illustrated in the accompanying drawings.

In the drawings:

Figure 1 is a diagrammatic view illustrating a cycle of operations in carrying out the invention;

Figure 2 is a transverse sectional view of a fruit showing means of holding the fruit during the cycle of operations and means for severing polar cap portions from the fruit;

Figure 3 is a view in side elevation, partly in section and partly broken away, illustrating the knife mechanism for severing the meat from the shell of the fruit after the polar caps have been removed;

Figure 4 is a cross sectional view taken along the line 4—4 of Figure 3 looking in the direction of the arrows;

Figure 5 is a side elevational view of the opposite side of the lower part of the knife mechanism shown in Figure 3;

Figure 6 is a vertical longitudinal sectional view taken on the line 6—6 of Figure 3;

Figure 7 is a view in perspective of the curved blade of a cutting mechanism shown in Figure 3;

Figure 8 is a fragmental cross sectional view of a portion of the fruit illustrating the position and movement of the knife through the meat thereof in the cutting operation;

Figure 9 is a transverse sectional view of the fruit shell after removal of the meat showing an elevation, and somewhat diagrammatically, a mechanism for rupturing resilient juice sacs adhering to the shell;

Figure 10 is a transverse section view of a stubbed fruit illustrating in elevation a spindle serving to support the fruit; and Figure 11 is a view in perspective of the meat of the fruit after being severed from the shell according to the invention.

Referring more particularly to the drawings and first to Figure 1, there is illustrated diagrammatically a fruit supporting table or carriage 1 which is rotatable, preferably, about a vertical axis 2. Positioned on the carriage 1, concentric with its rotational axis, is a circular series of equally spaced chucks, designated generally as 3, for holding the fruit to be operated upon and advancing it from a loading station to succeeding stations for the successive operations of the process. The carriage 1 may be rotated in step by step movement in any well-known manner to bring the chucks into operative position at the several operating stations and allow them to dwell at the stations for sufficient time for the operations.

The whole fruit is centered in the chucks at station 1, either by hand or suitable mechanism, with its polar axis or core vertical and coinciding with a circular path (indicated by the dotted line 4) passing through the center of the operating units to be described. The chucks 3 are preferably provided with a plurality of independently movable fruit gripping jaws 5 in order that the fruit may be gripped with its center in the desired path of travel 4. The jaws 5 are disposed about a circular aperture 3' in the table 1 and are provided with concave faces which engage the outer peel of the centered fruit at substantially, or slightly below, the horizontal mid-section of the fruit.

As seen in Figure 2, short prongs or teeth 6 may be provided on the chuck jaws to penetrate the peel slightly and assist in holding the fruit. The jaws 5 are movably attached to the table, such as by movable supporting members 7, and preferably engage the fruit with substantially equal pressure to maintain its centered position and natural shape of the peel throughout the process. The jaw pressures may be maintained until released after the final process step by suitable one-way restraining means, such as sprags 8, engaging the supporting member 7.

Located between station 1 and station 2 are a pair of parallel capping or "stubbing" knives 9. These knives, as best seen in Figure 2, are preferably circular and mounted on separate shafts rotating about a common vertical axis. The knives are spaced apart and relative to the fruit to cut off substantially equal polar cap portions as the fruit is advanced from station 1 to station 2. These cuts are preferably made deep enough polarwise of the fruit to cut just below the outer membrane at the polar ends of the segments and expose the meat of the segments as shown in Figure 2.

At station 2 the stubbed fruit is positioned below a curved blade, rotary cutting mechanism, designated generally as 10, the function of which is to sever the meat as a substantial whole from the band of peel and remaining outer membrane. The cutting mechanism is preferably supported above the table 1, such as by a bracket 11, sufficiently to permit the fruit to advance into operative position thereunder.

The mechanism 10 comprises a vertical shaft 12 journalled for rotation in a bearing 13 in the bracket 11 and carries, or has formed on its upper end, a bevel pinion 14. The shaft 12 is held against axial displacement between the pinion 14 and a collar 15 which respectively engage opposite end faces of the bearing 13.

The shaft 12 is provided with an axial bore 16 which communicates with a transverse slot 17 below the bearing 13. Mounted for axial movement in the bore 16 is a rod 18 to the lower end of which is secured a cross bar 19 which rides in and extends through the slot 17. The rod 18 extends upwardly beyond the shaft 12 and passes through a flanged bushing 20 which is rigidly secured in an extension 21 of the bracket 11 spaced above the bearing 13. The upper end of the rod 18 has secured thereto a collar 22, the under face of which is provided with radial V-shaped serrations 23 adapted to cooperate with similar serrations 24 on the upper face of the bushing 20 to impart a vertical reciprocating motion to the rod 18 upon rotation thereof as will be described.

Journalled for rotation in a bearing 25 in the bracket 11, intermediate the bearing 13 and extension 21, is a shaft 26 the axis of which intersects the axis of the rod 18 perpendicularly thereto. Secured to the shaft 26 is a 180° bevel gear segment 27 having a ratio of 2 to 1 with the bevel pinion 14 and adapted to intermittently mesh therewith. Attached to the front face of the gear segment 27 is a plate 28 provided with a cam slot 29 having a substantially 180° dwell portion 30, concentric with the shaft 26, and a rise portion 31. It will be noted from Figure 6 that the dwell portion 30 of the cam slot is displaced approximately 180° from the toothed portion of the gear segment.

Riding in the cam slot 29 is a roller 32 rotatably mounted on the flat front face 33 of a block 34 which is carried on the rod 18 for vertical movement with respect thereto between a pair of spaced collars 35 and 36 rigidly secured to the rod. A compression spring 37 is positioned between the lower collar 36 and the block 34 normally urging the rod 18 in a downward direction, the extent of movement being limited by engagement of the upper collar 35 with the block 34. It will be noted that the flat front face of the block 34 engages the opposing face of the cam plate 28 to prevent rotation of the block on the rod 18.

The shaft 26 is adapted to be coupled to a suitable driving mechanism, not shown but preferably synchronized with the movement of the table 1 and timed to effect one complete revolution of the shaft 26 each time one of a chucks 3 dwells at station 2.

The lower end of the shaft 12 is bifurcated and has pivotally mounted therein the upper end of a bracket 38 by means of a pin 39 which extends laterally from the shaft 12. The bracket 38 is offset radially and downwardly from the lower end of the shaft 12 and has attached to its lower end a bell crank 40 by means of a pivot pin 41. One arm 42 of the bell crank is inbent toward the shaft 12 and has secured thereto one end of a curved blade 43 which extends forwardly from the arm 42 in a curve substantially concentric with the pivot 41 and corresponds substantially to the longitudinal curvature of an average fruit. The longitudinal axis of the blade 43 substantially intersects the axis of rotation of the shaft 12.

The blade 43 is relatively narrow and provided over its length with a sharpened cutting edge 44 beveled from the back or convex face of the blade. Preferably the cutting edge 44 is serrated by means of a series of short slots 45 such as shown in Figure 7. The free end of the blade may also be sharpened, such as with a flat, chisel edge 46 also beveled from the back face of the blade. Preferably, however, the free or entering end of the blade is somewhat rounded or dulled sufficiently to prevent penetrating or cutting into the albedo. The back or convex face of the blade 43 has formed thereon a longitudinal series of spaced humps or ridges 47 preferably of elongated pyramidal configurations, such as illustrated in Figure 7 to offer a minimum resistance to the passage of the blade through the fruit. These ridges function, as will be seen, primarily to space the cutting edge of the blade 43 slightly from the inner surface of the peel to prevent the blade cutting thereinto.

The opposite arm 48 of the bell crank 40 has pivotally attached to the free end thereof one end of a link 49. The opposite end of the link 49 is pivotally attached to the outer end of a lever 50, the inner end of which is pivotally connected with the extension of the pin 39 in the pivotal axis of the bracket 38. A second link 51 connects an intermediate point of the lever 50 with the extended end of the cross bar 19.

As will be described more fully later, the curved blade 43 is adapted first to be moved downwardly through an angle about the axis of the pivot 41 to penetrate through the meat of the fruit adjacent the peel, then to be rotated for a single revolution about the axis of the shaft 12 while being reciprocated substantially along its arc of curvature to sever the meat from the peel, and finally to be withdrawn from the fruit by a reverse movement about the axis of the pivot 41.

Because fruits are of different sizes and because of the fact that they are very seldom round and the core of the fruit is very seldom in the polar axis or exact center of the fruit, and further because the peels of different types of fruit and fruit at different stages of maturity are of different thicknesses, it is desirable that the blade 43, rather than rotate concentrically with respect to the axis of the shaft 12 in its cutting circuit about the fruit, should be guided by the contour of the fruit peel. This may be accomplished as follows:

Pivotally attached adjacent the lower end of the shaft 12, for example, to the end of the pin 39 is an upstanding arm 52 adapted to swing in a limited arc on opposite sides of the vertical plane passing through the pivotal axis of the bracket 38. The upper or free end of the arm 52 carries one end of a tensioning spring 53 the opposite end of which is attached to a pin 54 carried by the bracket 38 below its pivotal axis 39. The degree of swing of the arm 52 may be conveniently controlled by shaping the lower end thereof with angular faces, as shown in Figure 5, to engage a shelf 55 on a shaft 12. The degree of swing of the bracket 38 about its pivot 39 may likewise conveniently be controlled by shaping the upper end of the bracket with angular faces to engage the upper wall of the bifurcation in the shaft 12 as indicated in Figure 3.

From the above, it will be seen that the bracket 38 will swing and be held resiliently on the same side of the vertical axis passing through its pivot point as that assumed by the free end of the arm 52. In other words, when the arm 52 is flipped in the direction toward the entering end of the blade 43, the blade will be urged resiliently outwardly from the axis of rotation of the shaft 12, and if the arm is flipped in the opposite direction, the blade will be urged resiliently toward the axis of rotation of the shaft 12.

To flip the arm 52 from one position to the other, with movement of the blade 43 about its horizontal axis of movement, the arm 52 is provided with a right angular offset 56 extending radially from the pivotal axis of the arm 52. Adapted to engage the end of the offset 56 is a notch 57 in the free end of a freely swingable, depending rod 58 carried by the cross bar 19.

As seen in Figure 5, when the cross bar 19 is in its extreme upper position, the upper shoulder of the notch 57 engages the offset 56 which is in a slightly upwardly inclined position. Upon the initial downward movement of the bar 19, the rod 58 moves the offset 56 through an arc which flips the arm 52 over to the opposite side. As the arm 52 flips over the spring 53 moving to the opposite side of the pivot 39, flips the bracket 38 to the opposite side. On continued downward movement of the bar 19 the notch 57 rides over the now downwardly inclined offset 56 permitting unrestrained, continued downward movement of the rod 58 to the lower limit of travel of the cross bar 19. Upon return movement of the cross bar, the reverse takes place, that is, the cross bar continues to move upwardly until nearly the limit of its upward movement when the notch 57 reengages the offset 56 to flip the arm 52 and bracket 38 back to their original positions.

In order to guide at least the initial penetration of the blade 43 into the fruit to correctly start the cut just inside the outer membrane, there is provided an outwardly and downwardly inclined finger or follower 59 on the end of an arm 60 pivotally carried by a right angular extension 61 of the bracket 38. An adjusting screw 62 carried by a right angular extension 63 of the arm 60 and engaging the bracket extension 61, as shown in Figure 3, is provided to adjust the follower 59 toward or away from the entering end of the blade 43.

As stated, the fruit is moved into position at station 2, preferably below the cutting mechanism 10. After moving into position, it may be elevated into cutting position with respect to the blade 43 by any convenient means such as by raising the carriage 1. At this time the rod 18 will be in its up position and the bracket 38 flipped so that the entering end of the blade 43 and the follower 59 are urged toward the axis of rotation of the shaft 12. As the fruit moves to its raised position, the inclined follower 59 is engaged by the outer surface of the band of peel and, when the fruit is fully raised to the position shown in Figure 3, will move the bracket 38 about its pivotal axis 41 so that the entering end of the blade will be in position to penetrate the meat just inside the outer membrane.

While the fruit dwells in cutting position, the shaft 26 is brought into operation to rotate the gear segment 27 and cam plate 28 from their initial position shown in Figure 6 through one complete revolution. As the gear segment 27 and cam 28 are rotated through the first 90° of their revolution, the cam slot 29 moves the roller 32 from the high point of the slot to the beginning of the dwell portion to lower the rod 18 until the serrated face of the collar 22 engages the serrated face of the bushing 20 and the teeth of the gear segment commence to engage the bevel pinion 14. At the same time, the bell crank 40 will be rocked about the pivot 41 by means of the link 51, lever 50, link 49 to move the curved blade 43 downwardly through an arc about the pivot 41. It is to be understood that the amount of rise of the cam slot 29, the lengths of the lever arms 48 and 50 and the point of connection of the link 51 with lever 50 is so proportioned that movement of the cam with respect to the roller 32 from the high point of the cam rise 31 to the dwell portion 30 will move the blade 43 sufficiently to completely penetrate the stubbed fruit.

At the beginning of the downward movement of the rod 18, the entering end of the blade 43, as stated above, is resiliently urged toward the axis of the shaft 12 and the finger 59, determining the position of the entering end of the blade with respect to the peel surface, will cause it to enter the meat at the desired point just inside the outer membrane. After the blade has penetrated a short distance, however, continued downward movement of the rod 20 will cause the bracket 38 to be flipped in the opposite direction and the blade will now be urged resiliently outwardly from the axis of the shaft 12 or toward the band of peel, and thereafter, and until the blade is nearly withdrawn from the fruit, it will tend to follow automatically the contour of the peel. The humps or ridges 47 on the rear face of the blade serves to limit the outward movement of the blade and their height may be calculated to give a desired depth of cut back from the outer membrane to assure the meat will be severed cleanly therefrom without danger of cutting into the outer membrane and peel. It might be noted also, that the pyramidal shape of the ridges 47 offer a minimum resistance to the downward penetrating movement of the blade and to its cutting movement around the fruit, and likewise serve to reduce the resistance offered by the flat surface of the blade as it is urged outwardly toward the peel.

During the next 180° of revolution of the shaft 26, the roller 32 rides in the concentric dwell portion 30 of the cam slot and the gear segment 27, meshing with the gear 14, rotates the shaft 12 and, through its connection therewith, moves the blade 43 through a 360° arc and completely severs the meat from the peel and outer membrane. Through the sliding key connection with the shaft 12 afforded by the cross bar 19, the rod 18 is likewise rotated and the serrated face of the collar 22 rides over the serrated face of the fixed bushing 20. This action, together with the action of the spring 37, causes a rather rapid vertical reciprocation of the shaft 18 which is translated through the link 51, lever 50, link 49 and bell crank 40 to a corresponding oscillation of the blade about the pivot 41, or substantially along the arc of curvature of the blade, and imparts to the blade a sawing action which moves the cutting edge freely and cleanly through the meat and radial membranes. Preferably, the depth of the serrations 23 and 24 are so proportioned with respect to the above-mentioned lever arms that an oscillating movement through an arc of about one quarter inch is imparted to the blade.

At the end of the just described 180° rotation of the shaft 26, the gear segment 27 disengages the pinion 14 and rotation of the shaft 12 stops. During the following and final 90° of revolution of the shaft 26, the roller 32 rides up to the high portion of the cam slot 29 and returns the rod 18 and blade 43 to their initial positions. As the entering end of the blade nears the upper stubbed surface of the fruit, the notch 57 reengages the offset 56 to flip the arm 52, and thereby the bracket 38, back to their initial positions preparatory for operation of the cutting mechanism on a succeeding fruit.

While the band of peel acts as a substantial support for the meat while being severed, it may be desirable under certain conditions to supply additional support for the meat which may prove advantageous, particularly when the blade nears the completion of its cutting travel around the fruit. To this end, there may be provided a series of vertical and preferably non-rotatable spindles 64, such as illustrated in Figure 10, one at each of the chuck positions on the table 1. These spindles comprise a plurality of vertical tines or prongs 65 secured to a head 66, preferably below the level of the fruit and capable of vertical movement whereby the tines may be inserted upwardly and axially into the meat of the stubbed fruit. They may be brought into use at any convenient point in the operating cycle of the machine. For example, they may be raised to penetrate the chucked fruit immediately after stubbing and before arrival at station 2, or after the fruit has arrived at station 2 and before the actual cutting operation has begun. After the meat has been severed from the band of peel, the spindles may be again lowered and aid in removing the severed meat from the band of peel.

After the meat has been cut from the band of peel, there will usually remain enough unruptured and partial juice sacs attached to the outer membrane in the band of peel to make it economically advisable to recover this juice. To this end, the band of peel, after removal of the meat therefrom and while still retained in the chuck, is advanced to a station 3 where it is subjected to an internal rubbing action to rupture these remaining juice sacs.

A tool which may be employed for this juice extraction is illustrated in Figure 9 and comprises a shaft 67 mounted for axial reciprocation and for rotation about a vertical axis substantially coaxial with the band of peel at station 3. Pivotally attached to the lower end of the shaft 67, for movement about an axis perpendicular thereto, is a bell crank member 68, the depending arm 69 of which is provided with an offset rubbing element 70 having a rounded face adapted to engage the inner surface of the peel. The rubbing element 70 is resiliently urged in a direction outwardly from the axis of rotation of the shaft 67 by suitable means such as a coil spring 72 connecting the other arm 73 of the bell crank with the shaft 67. As stated, the shaft 67 is capable of axial as well as rotary movement, as indicated by the arrows, and to provide for insertion and withdrawal of the rubbing element 70 in the peel, the outer end of the bell crank arm 73 may be provided with a roller 74 which engages an annular stationary track 75 when the shaft 67 is in its up position to depress the arm 73 and hold the rubbing element in an "in" position toward the axis of rotation of the shaft 67 against the tension of the spring 72.

When the band of peel is moved into position at station 3, the shaft 67 is rotated and lowered and, as the rubbing element approaches the upper rim of the peel band, the roller 74 disengages the track 75 and the rubbing element is urged outwardly by the spring 72 into yielding contact with the juice sacs adhering in the peel. With continued downward movement of the rotating shaft 67, the rubbing element moves in a helical path following the inner contour of the band of peel and its outward pressure thereon ruptures the juice sacs and expresses their juice which thereupon may be collected. At the end of its down stroke, the shaft 67 is retracted to its normal up position.

It will be understood, of course, that the polar cap portions removed from the fruit in the stubbing operation may be subjected to juice extraction by conventional methods.

After the juice extraction step, the band of peel still in the chuck is moved toward the loading station 1. During this passage the sprags 8 may be released allowing the chuck to open and release the peel which will fall through the opening 3' to collection and disposal or subsequent processing.

From the foregoing, it will be seen that the stubbed fruit is first penetrated by a narrow, curved blade which fits substantially the arc of curvature of the inner surface of the peel. This blade is then moved in a single circuit about the fruit while oscillated about the axis of its curvature with a rapid sawing motion. While this is being done, the blade is urged resiliently toward, but spaced slightly from, the inner surface of the outer membrane which causes it to follow substantially the equatorial curvature of the fruit. Finally, the blade is withdrawn from the fruit in the arc of the cut just made. This system, it will be seen, will result in a cleanly cut meat ready for separation of its substantially whole segments from the remaining membrane.

While for the purpose of this application, the tools such as the cutting mechanism and juice squeezing mechanism are shown to rotate with respect to stationary fruit, it will be apparent that substantially the same results may be obtained by rotating the fruit with respect to non-rotating tools. It will be understood also that various forms of power mechanisms may be employed for the machine and the operation of its associated tools. For simplicity, no such mechanisms have been shown since they form no part of the present invention. It will be understood, however, that the several operating tools may be driven individually by suitable mechanism or driven in timed cycles with the operation of the table to provide a fully automatic machine.

We claim:

1. Apparatus for removing the meat as a substantial whole from stubbed citrus fruit comprising a longitudinally curved blade having an axis of oscillation substantially about the center of curvature thereof and an axis of revolution normal to the axis of oscillation, mechanism associated with the blade including means for moving the same through an angle about said axis of oscillation in an intermittent reciprocating movement to penetrate through the meat and then withdraw the blade therefrom, other means for moving the blade about said axis of revolution through a single circuit about the meat between said reciprocations, and means for imparting a substantially rapid oscillating movement to said blade through a relatively small angle about said axis of oscillation during said circuit.

2. Apparatus for removing the meat as a substantial whole from stubbed citrus fruit comprising a longitudinally curved blade having an axis of oscillation substantially about the center of curvature thereof and an axis of revolution normal to the axis of oscillation, mechanism associated with the blade including means for moving the same through an angle about said axis of oscillation in an intermittent reciprocating movement to penetrate through the meat and then withdraw the blade therefrom, other means for moving the blade about said axis of revolution through a single circuit about the meat between said reciprocations, resilient means for urging the blade radially outward from said axis of revolution at least during said circuit, and raised means disposed on the convex face of said blade and engageable with the outer membrane of the fruit for spacing said cutting edge inwardly therefrom.

3. Apparatus for removing the meat as a substantial whole from stubbed citrus fruit comprising a longitudinally curved blade having an axis of oscillation substantially about the center of curvature thereof and an axis of revolution normal to the axis of oscillation, mechanism associated with the blade including means for moving the same about said axis of oscillation in an intermittent reciprocating movement to penetrate through the meat and then withdrew the blade therefrom, other means for moving the blade about said axis of revolution through a single circuit about the meat between said reciprocations, resilient means for urging the blade radially outward from said axis of revolution at least during said circuit, and a series of longitudinally spaced raised members disposed on the convex face of said blade, each of said members having a pyramidal configuration and adapted for engagement with the outer membrane of the fruit to space the cutting edge of the blade inwardly therefrom.

4. Apparatus for removing the meat as a substantial whole from stubbed citrus fruit comprising a longitudinally curved blade having an axis of oscillation substantially about the center of curvature thereof and an axis of revolution normal to the axis of osillation, mechanism associated with the blade including means for moving the same through an angle about said axis of oscillation in an nintermittent reciprocating movement to penetrate through the meat and then withdrew the blade therefrom, other means for moving the blade about said axis of revolution through a single circuit about the meat between said reciprocations, means for imparting a substantially rapid oscillating movement through a relatively small angle about said axis of oscillation during said circuit, resilient means for urging the blade radially outward from said axis of revolution at least during said circuit, and a series of longitudinally spaced raised members disposed on the convex face of said blade, each of said members having a pyramidal configuration and adapted for engagement with the outer membrane of the fruit to space the cutting edge of the blade inwardly therefrom.

5. Apparatus for removing the meat as a substantial whole from stubbed citrus fruit comprising a longitudinally curved blade having an axis of oscillation substantially about the center of curvature thereof and an axis of revolution normal to the axis of oscillation, holding means for supporting the stubbed fruit with the polar axis thereof substantially coaxial with said axis of oscillation and with the axis of oscillation lying in a plane passing substantially through the center of the fruit, mechanism associated with the blade including means for moving the same through an angle about said axis of oscillation in an intermittent reciprocating movement to penetrate through the meat and then withdraw the blade therefrom, other means for moving the blade about said axis of revolution through a single circuit about the meat between said reciprocations, and means for imparting a substantially rapid oscillating movement through a relatively small angle about said axis of oscillation during said circuit.

6. Apparatus for peeling citrus fruit comprising means engaging whole fruit about the equatorial region thereof, cutting means for severing at least the peel and outer membrane from adjacent opposite polar regions of the fruit to expose the meat while leaving an equatorial band of peel intact on the fruit, blade means having a longitudinal arc of curvature corresponding substantially to the longitudinal curvature of the meat adjacent the peel, said blade having an axis of oscillation substantially about the center of said arc and an axis of revolution normal to said axis of oscillation, said holding means positioning the fruit with respect to the blade means to support the fruit with the polar axis thereof substantially coaxial with said axis of revolution and the axis of oscillation lying in a plane passing substantially through the center of the fruit, mechanism associated with the blade and including means operative to move the same about said axis of oscillation in an intermittent reciprocating movement to penetrate through the meat, then withdraw the blade therefrom and other means operative to move the blade about said axis of revolution through a single circuit about the fruit between said reciprocations, means for imparting a substantially rapid oscillating movement of the blade about said axis of oscillation through a substantially small angle during said circuit, and means for moving said holding means successively into operative relation to said cutting means and blade means.

7. Apparatus for peeling citrus fruit comprising means engaging whole fruit about the equatorial region thereof, cutting means for severing at least the peel and outer membrane from adjacent opposite polar regions of the fruit to expose the meat while leaving an equatorial band of peel intact on the fruit, blade means having a longitudinal arc of curvature corresponding substantially to the longitudinal curvature of the meat adjacent the peel, said blade having an axis of oscillation substantially about the center of said arc and an axis of revolution normal to said axis of oscillation, said holding means positioning the fruit with respect to the blade means to support the fruit with the polar axis thereof substantially coaxial with said axis of revolution and the exis of oscillation lying in a plane passing substantially through the center of the fruit, mechanism associated with the blade and including means operative to move the same about said axis of oscillation in an intermittent reciprocating movement to penetrate through the meat, then withdraw the blade therefrom and other means operative to move the blade about said axis of revolution through a single circuit about the fruit between said reciprocations, means for imparting a substantially rapid oscillating movement of the blade about said axis of oscillation through a substantially small angle during said circuit, raised means disposed on the convex face of said blade and engageable with the outer membrane for spacing said cutting edge inwardly therefrom, and means for moving said holding means successively into operative relation to said cutting means and blade means.

RALPH POLK, Sr.
RALPH POLK, Jr.

REFERENCES CITED

The following references are of record in the file of this patent:

UNITED STATES PATENTS

| Number | Name | Date |
|---|---|---|
| 1,277,148 | Starr | Aug. 27, 1918 |
| 1,452,930 | Polk | Apr. 24, 1923 |
| 1,463,233 | Ulrich | July 31, 1923 |
| 1,477,662 | Perry | Dec. 18, 1923 |
| 1,631,854 | Carroll | June 7, 1927 |
| 2,169,963 | Kerr | Aug. 15, 1939 |
| 2,342,131 | Erickson | Feb. 22, 1944 |